United States Patent
Lin et al.

(10) Patent No.: US 6,490,288 B1
(45) Date of Patent: Dec. 3, 2002

(54) ADDRESS MEMORY STRUCTURE AND METHOD FOR PROCESSING NETWORK NODE ADDRESSES IN THE ETHERNET SWITCH

(75) Inventors: Ho-Shyan Lin, Hsinchu (TW); Wen-Tsung Lin, Tainan (TW)

(73) Assignee: Winbond Electronics Corp., Hsinchu (TW)

( * ) Notice: Subject to any disclaimer, the term of this patent is extended or adjusted under 35 U.S.C. 154(b) by 0 days.

(21) Appl. No.: 09/092,837

(22) Filed: Jun. 5, 1998

(30) Foreign Application Priority Data

Mar. 20, 1998 (TW) .......................... 87104225 A

(51) Int. Cl.⁷ .................. H04L 12/56; G06F 15/173
(52) U.S. Cl. .................. 370/401; 370/389; 370/392; 370/397; 709/238; 709/249
(58) Field of Search .................. 370/401, 389, 370/392, 397, 400, 422, 404, 395, 398, 399; 709/238, 245, 249, 250, 222, 220, 221, 228

(56) References Cited

U.S. PATENT DOCUMENTS 5,657,314 A * 8/1997 McClure et al. ............ 370/401
5,931,910 A * 8/1999 Kwon ........................ 709/222
6,012,097 A * 1/2000 Kwon ........................ 709/238
6,078,415 A * 6/2000 Yamamoto .................. 359/128
6,111,874 A * 8/2000 Kerstein ..................... 370/389
6,240,485 B1 * 5/2001 Srinivasan et al. .......... 711/108
6,269,098 B1 * 7/2001 Crayford .................... 370/389

* cited by examiner

Primary Examiner—Wellington Chin
Assistant Examiner—M. Phan
(74) Attorney, Agent, or Firm—Ladas & Parry

(57) ABSTRACT

An address memory structure used in an Ethernet switch, comprising an index memory and an address table memory is disclosed. The index memory is used for storing the vendor code section and the address table memory is used for storing the serial code section. The vendor code index data connects the index memory data to the address table memory data. When comparing the node addresses, the serial code section in the address table memory is compared first. If there is a consistent entry, the corresponding vendor code section is compared through the vendor code index data. When adding a new node address, the corresponding vendor code index data is attained, and the vendor code index data and the serial code of the node address are then written into the address table memory.

3 Claims, 3 Drawing Sheets

| Port | Soure Code | Life Time |
|---|---|---|
| 4 | $C_{42}$ | ⋰ |
| 2 | $C_{21}$ | ⋰ |
| 2 | $C_{22}$ | ⋰ |
| 1 | $C_{12}$ | ⋰ |
| ⋮ | ⋮ | ⋮ |

ADDRESS MEMORY STRUCTURE AND METHOD FOR PROCESSING NETWORK NODE ADDRESSES IN THE ETHERNET SWITCH

BACKGROUND OF THE INVENTION

1. Field of the Invention

The present invention in general relates to an Ethernet switch technique. More specifically, it relates to a new architecture of address memory in an Ethernet switch to be applied for recognizing network node addresses, thereby making it is possible to store a greater number of addresses in limited memory space and achieve more efficient memory usage.

2. Description of the Prior Art

The function of the switch is to transfer information between different networks; that is, connecting a number of individual networks into a larger, more complete information transferring network. FIG. 1 (Prior Art) shows a structural diagram for a general switch which can be applied in networks. In FIG. 1, switch 10 connects to network 1, network 2, network 3 and network 4, respectively. When users in network 1 need to send data to another network, the data transfer can be accomplished through switch 10, which transfers said data to network 2, network 3 or network 4 as needed. In this manner, a given network can transfer data to any other network.

The service provided by switch 10 is determined by the protocol used in each network. If the data transfer occurs between two Ethernet networks, for example, the switch (termed a layer 2 switch) can transfer the data without data processing because the protocols of the sending and receiving networks are the same. However, if transferring data between a token ring network and an Ethernet network, the switch (termed a layer 3 switch) must process data because the packet structure of the two network protocols is different, making the layer 3 switch a more difficult one to design. The present invention focuses on an Ethernet switch to be applied for transferring data between Ethernet networks. Today, Ethernet networks are the most widely used networks. For example, a large company might establish an Ethernet network in each of its departments, then connect these networks serially through an Ethernet switch. Accordingly, the Ethernet switch is a very important network product.

An Ethernet switch is used to transfer data between networks having the same protocol and therefore is simpler in design. When a data packet is sent from one network to another, the Ethernet switch will first store the data packet. Then, according to the relevant information contained in the data packet, the switch determines the destination of the packet. Finally, it transfers the data packet to the destination network, completing the switching operation. From the process described above, it can be seen that two kinds of memory are required in an Ethernet switch. One is data buffer memory, which is used for storing data packets being processed. The other is address table memory, which is used for storing the address of each network node. An Ethernet network is usually composed of several connected nodes known as general terminal equipment. In Ethernet networks, each of the network nodes (terminal equipment) connects to the Ethernet network through an Ethernet switch. When an Ethernet network card is being produced, a unique address code whose length is 6 bytes is assigned to it. Presently, the Ethernet network card's address code is used as the network node address in Ethernet networks. The Ethernet switch decides the location of each network node according to this address code.

FIG. 2 (Prior Art) and FIG. 3 (Prior Art) explain the switch method between Ethernet networks, wherein FIG. 2 illustrates an example of an Ethernet network switch architecture, and FIG. 3 illustrates the structure diagram of a network node address table maintained by an Ethernet switch. In FIG. 2, Ethernet switch 10 is provided with four ports, denoted by 101(the first port), 102(the second port), 103(the third port), and 104(the fourth port). The ports 101,102,103,104 connect to networks 1,2,3,4, respectively. Network 1 comprises at least nodes $C_{11}$ and $C_{12}$; network 2 comprises at least nodes $C_{21}$ and $C_{22}$; network 3 comprises at least nodes $C_{31}$ and $C_{32}$; network 4 comprises at least nodes $C_{41}$ and $C_{42}$. In FIG. 3, the Ethernet switch address table contains several node address data entries. Each of the data entries contains three kinds of data, e.g., port, source code, and lifetime, which are used to indicate the information of known network nodes. The port data is used to indicate which port of the Ethernet switch the network node is connected to. The source code data is used to indicate the address code of the network node (that is the address code of the Ethernet network card). The lifetime data is used to indicate the last time the data corresponding to a given network node was used, information utilized to determine whether the data of a particular network node should be kept or not. This is necessary because the memory space in the switch is limited. Therefore, the data for a node that is not used, for a long time, or perhaps off line, can be deleted first.

When the switch architecture in FIG. 2 is started up, the Ethernet switch stores no data for the network nodes, e.g., the table in FIG. 3 is blank. When a node in the network sends out a data packet (possibly to itself or to any other network that can be switched), then Ethernet switch 10 determines the port which the source code is connected to and the actual address of the source code, data which is then written into the address table of the network node. It should be noted that an Ethernet network can only record the source node data for a node that sends out a data packet, it can not record the destination node data. After Ethernet switch 10 has received a data packet, it will compare its destination address with the information of the nodes recorded, determining the network containing the destination node. If the destination node has been recorded, the Ethernet switch will send the data packet to the corresponding port. If the destination node has not been recorded, Ethernet switch 10 will be unable to find the true location of the destination node, and it will go to broadcast, e.g., sending the data packet to all of the other networks. For example, when source node $C_{12}$ (the first port) wants to send a data packet to destination node $C_{32}$, as shown in FIG. 3, Ethernet switch 10 does not have a record of the address information for node $C_{32}$. Therefore, it will send the data packet to network 2 (the second port), network 3 (the third port) and network 4 (the fourth port). Hence, for an n-port switch, the traffic for a single data transfer would be (n−1) times for a broadcast, thereby decreasing the system performance.

Accordingly, the functioning of the address memory has a significant impact on Ethernet performance. In an Ethernet switch design, there are two key concerns: first, the memory interface bandwidth, which relates to the speed of read and write; second, the memory size, which affects the number of node addresses it can store. Under broadcast conditions as described above, the Ethernet switch design will indirectly effect the traffic in the network, thereby influencing the probability of data collision. The present invention focuses on the problem of memory size. As described above, the memory space in an Ethernet network switch is limited. Smaller memory space will decrease the number of node addresses recorded and increase the occurrence of broadcast, thereby increasing network traffic. On the other hand, memory size is limited by several practical considerations, such as limitations on physical space and cost. Therefore, the question of how to store more network node address information without sacrificing the network performances is an important one.

SUMMARY OF THE INVENTION

Therefore, an object of the present invention is to provide an architecture of address memory and a method of node address management, thereby allowing more network node address information to be stored in limited memory space and promoting the efficiency of the address memory. Another object of the present invention is to shorten the read/write bytes, thereby promoting the read/write speed of the node addresses.

The present invention achieves the above-indicated object by providing an address memory architecture for an Ethernet switch, comprising an index memory and an address table memory. The index memory comprises several vendor code index entries. Each of the vendor code index entries includes a vendor storage section and index section for storing the index of the vendor code in the corresponding vendor storage section. The address table memory comprises a plurality of address entries. Each of the address entries stores one node address and includes a first storage section and a second storage section. The first storage section is used for storing the index data of the vendor code of the node address. The second storage section is used for storing the serial code of the node address. While a new network node address is obtained, the vendor code of the new node address is compared with the index memory to determine the corresponding index data. If it exists already, then the corresponding index data is directly retrieved. If it does not exist, then a new entry in the index memory is created, and the new index data is retrieved. Finally, the index data and the serial code of the node address are written into the address table memory that records all the node addresses. Since the vendor codes are recorded by their corresponding index data, memory usage is improved and the access time for the these node addresses is reduced.

BRIEF DESCRIPTION OF THE DRAWINGS

The following detailed description, given by way of example and not intended to limit the invention solely to the embodiments described herein, will best be understood in conjunction with the accompanying drawings, in which.

DETAILED DESCRIPTION OF THE PREFERRED EMBODIMENTS

The address memory architecture employed in the Ethernet switch of the present invention is designed in conformity with the address code features of the common Ethernet network card, but improving it in such a way as to be able to store more network node addresses in the same memory space. Therefore, we will illustrate the general address code first, and then explain the present invention in detail with reference to the drawings.

Figure 1:
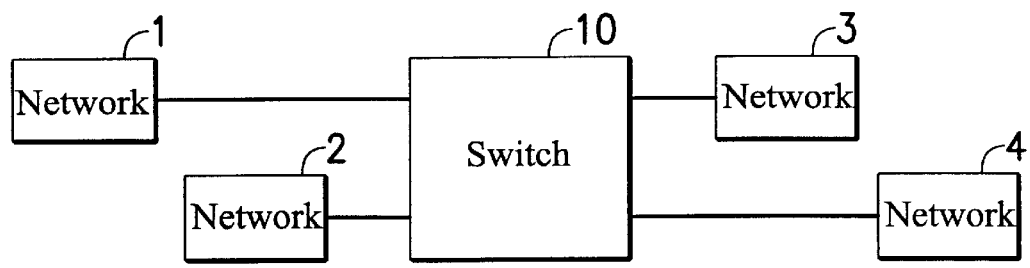
FIG. 1 (Prior Art) is a block diagram showing a general switch in the switch application between networks.
Figure 2:
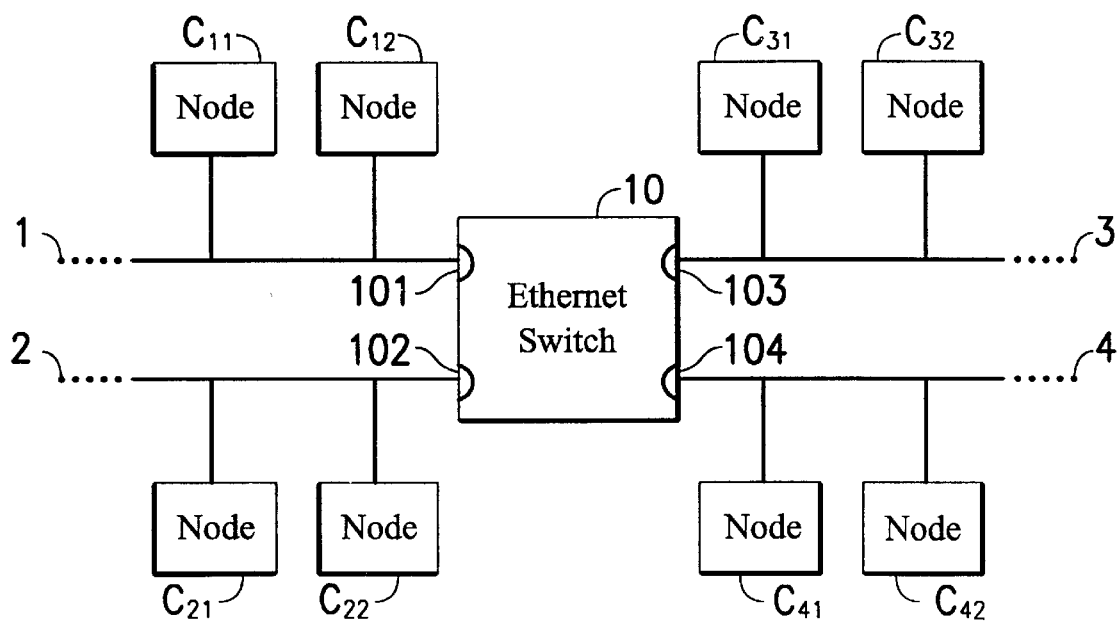
FIG. 2 (Prior Art) is an example of the general Ethernet switch architecture.
Figures 3, 4:
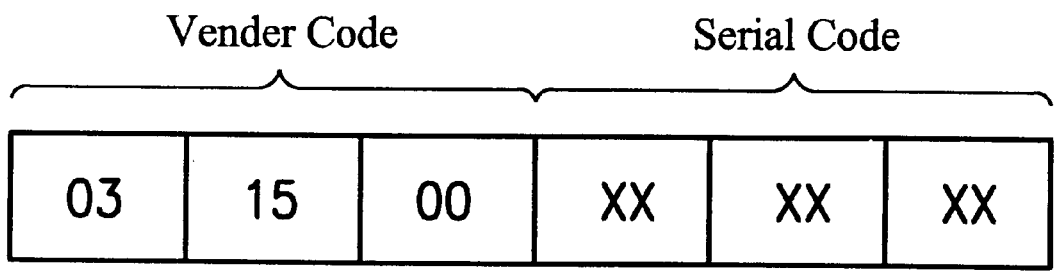
FIG. 3 (Prior Art) is a diagram showing the network node address table in a general Ethernet switch.
FIG. 4 (Prior Art) is a diagram showing the data structure of a general network node address.

FIG. 4 is the diagram of the data structure of the address code employed in the general Ethernet network. As shown in FIG. 4, the address code is 6 bytes long. The first three bytes are called the vendor code, and the last three bytes are called the serial code. To ensure the uniqueness of the address code for each Ethernet network card, the vendor code is controlled, e.g., manufacturers are not allowed to assign the codes arbitrarily. Instead, the vendor code is usually issued to the manufacturer upon application to the International Standard Organization. Therefore, the first three bytes of an address code identify the manufacturer of the network card. When a manufacturer obtains a vendor code of "04 15 00" (hex), it can add serial codes in turn to produce Ethernet network card addresses, until all the serial codes are used, at which point the manufacturer must apply for another vendor code to go on manufacturing. However, a manufacturer can produce about sixteen million Ethernet network cards under the same vendor code, so for a general-scaled manufacturer, a single vendor code can be used for years.

Accordingly, the vendor code and the serial code are significantly different elements of an address code. Because there are only a limited number of Ethernet card manufacturers, the number of vendor codes is not large. Furthermore, a company which employs an Ethernet network will typically buy the required Ethernet network card in a package deal. To ensure consistency, a company will generally employ cards produced by the same manufacturer in the same period of time. Therefore, the variation of vendor codes in the network cards of a given network is usually quite limited. In comparison, the serial codes of an individual Ethernet network, let alone those of an entire company, vary considerably. In sum, the embodiment of the present invention achieves the object of the invention by making use of both the constancy of the vendor codes and the variance of the serial codes mentioned above.

Figure 5:
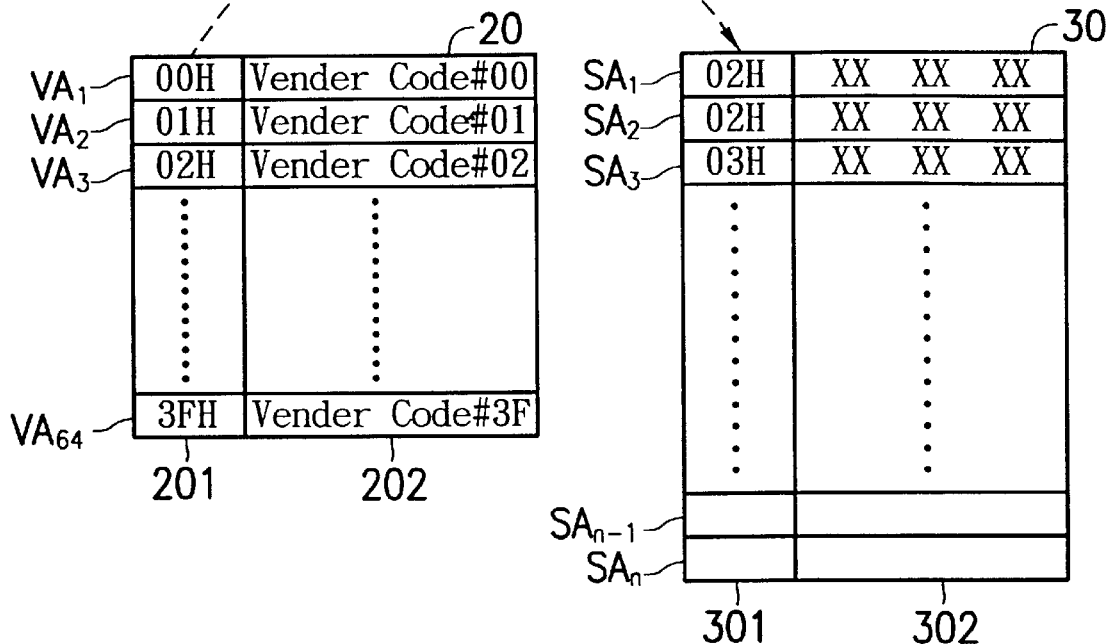
FIG. 5 is a diagram showing the address memory for storing the network node address in the Ethernet switch according to the present invention.

The solution shown in this embodiment is to change the storage address memory structure. FIG. 5 shows the diagram of the storage address memory structure in the Ethernet switch of the embodiment. As shown in FIG. 5, address memory comprises two parts, the index memory 20 and the address table memory 30. 10 The index memory 20 comprises a plurality of vendor code index entries $VA_1 \sim VA_n$, n=64, for example. Each of the vendor code index entries ($VA_1 \sim VA_{64}$) includes two storage sections, the index section 201 and the vendor code storage section 202. The index section 201, whose length is 1 byte long (8 bits), is used to store the index data corresponding to each of the index entries. It can represent numbers in the range of 00 (hex) ~3F(hex). The vendor code storage section 202, whose length is 3 bytes, is used to store the actual corresponding vendor code. In the index memory 20, the index data in index section 20 corresponds to the vendor codes in the vendor code storage section one to one.

The address table memory 30 comprises a plurality of address entries $SA_1 \sim SA_n$. Each of the address entries includes the vendor code index storage section 301 and the serial code storage section 302, corresponding to a recorded network node address, respectively. The vendor code index storage section 301, whose length is 1 byte long, stores the index data corresponding to the vendor code of the node address. The serial code storage section 302, whose length is still 3 bytes long, stores the complete serial code of the node address. The key to reducing the needed memory space is to make use of the index data, whose length is 1 byte long, to replace the source vendor code, whose length is 3 bytes long. Consequently, the length of each stored address is reduced from the 6 bytes of the prior art to 4 bytes, a reduction of ⅓, while at the same time increasing the amount of memory space available for the index memory. Furthermore, as discussed above, the number of vendor codes is quite limited. Therefore, the memory space needed by the index memory 20 is far less than that needed by the address table memory 30. In this manner, the memory usage efficiency exceeds that of the prior art.

Supposing that the number n in FIG. 5 is 1024, the following is a comparison of the memory space needed by the embodiment with that needed by the prior art. In the embodiment, the memory space of the index memory 20 is fixed. As shown in FIG. 5, 64*4=256 bytes are needed. The memory space of the address table memory 30 is changes along with the number n. When the number n is 1024, it needs 1024*4=4352 bytes, the sum of the total memory space being 256+4096=4352 bytes. However, in the prior art, if the number n is 1024, 1024*6=6144 bytes are needed, which is about 1.4 times the memory needed by the embodiment. Accordingly, the embodiment is better than the prior art in terms of the efficiency of memory usage. In addition, when a data package comes into the Ethernet switch, it will be compared with the node addresses recorded in the address table memory 30. Without taking into consideration the search technique, each comparison will read out an address entry (totally 4 bytes) from the address table memory 30. Only when the serial codes are consistent with each other does it need to read out the vendor code of the index memory 20. Because the chance of even a very large network having two network cards with the same serial number is quite slim (occurring only when two cards with the same serial code but different vendor numbers are incorporated into the same network), the number of the read average bytes needed in the embodiment to compare a code address is about 4 byte, and if not considering the vendor code index data, it is only 3 bytes. Therefore, the number of the read average bytes of the embodiment is about 2 bytes less compared to the prior art. It follows that the reading speed of the embodiment will be quicker than the prior art.

Figure 6:
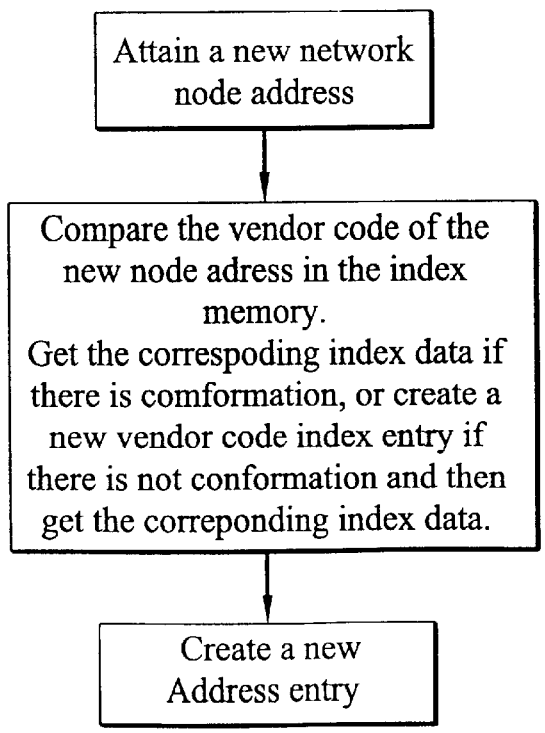
FIG. 6 is a flow chart showing how to add a new network node address to the Ethernet switch according to the present invention.

Finally, FIG. 6 shows the flow chart of the process when adding a new network node address to the Ethernet switch. First, the switch attains a new network node (S1) when there is no match in comparison with the recorded network nodes. Then, it compares the vendor code of the new node address to those in the index memory. If there is conforming recorded vendor code data, the switch reads out the corresponding index data. If there is not, it creates a new vendor code index entry and obtains the corresponding index data (S2). Last, the index data is written into the corresponding column to create a new address entry (S3).

In summary, the advantages of the storage address memory structure employed in the embodiment can describe as follows:

1. So far as the efficiency of the memory usage is concerned, the number of bytes needed for recording each node address in the embodiment is about 4. When the entries in the index memory are few in number or those in the address table memory are great, the efficiency of the memory usage will be higher. The actual numbers of both depend on the practical application of the Ethernet switch, and the number employed in the above embodiment is not intended to limit the invention. On average, the total memory needed in the present invention is ⅓ less than that of the prior art.

2. So far as the speed of the packet processing and the address routing is concerned, owing to the reduction in the length of the bytes needed for the node address data in the present invention, the read average bytes of each address entry is reduced from 6 to 4. Therefore, the time needed to read/write each node address is reduced by about ⅓.

The foregoing description of the preferred embodiment of the present invention has been provided for the purposes of illustration and description. It is not intended to be exhaustive or to limit the invention to the precise forms disclosed. Many modifications and variations will be apparent to practitioners skilled in the art. The embodiments were chosen and described to best explain the principles of the invention and its practical application, thereby enabling others skilled in the art to understand the invention to practice various other embodiments and make various modifications suited to the particular use contemplated. It is intended that the scope of the invention be defined by the following claims and their equivalents.

What is claimed is:

1. An address memory structure used in an Ethernet switch, comprising:

an index memory having a vendor code index entry, said vendor code index including an index section and a vendor code index including an index section and a vendor code storage section, the index data of the index section corresponding to a vendor code of the vendor code storage section, and an address table memory having a plurality of address entries for storing corresponding network node addresses, said address entries having a first storage section and a second storage section, the first storage section storing the index data in the index memory corresponding to the vendor code of the network node address, and the second storage section storing the serial code of the network node address, respectively, wherein the length of the index section in the index memory is 1 byte and the length of the vendor code storage section in the index memory is 3 bytes, and the length of the first storage section in the address table memory is 1 byte and that of the second storage section in the Address table memory is 3 bytes.

2. An Ethernet switch communicating between network nodes in at least one local network, each network node having a network node. address, the network node address comprising a vendor code and a serial code, and the Ethernet switch having an address memory and a data memory, the address memory comprising:

an index memory having a vendor code index entry, said vendor code index entry comprising an index section and a vendor code storage section, an index data in the index section corresponding to the vendor code in the vendor code storage section, and an address table memory having a plurality of address entries, each address entry storing a corresponding network node address and comprising a first storage section and a second storage section, the first storage section storing the index data in the index memory corresponding to the vendor code of the network node address, and the second storage section storing the serial code of the network node address, respectively, wherein the length of the index section in the index memory is 1 byte and the length of the vendor code storage section in the index memory is 3 bytes, and the length of the first storage section in the address table memory is 1 byte and that of the second storage section in the address table memory is 3 bytes.

3. A method for processing network node addresses, which can be applied to an Ethernet switch provided with an index memory and an address table memory comprising the steps of:

getting a new network node address;

comparing the vendor code of the network node address with the index memory;

searching for a conforming entry in the index memory according to the vendor code of the network node address;

outputting the index data of the conforming entry when the conforming entry exists;

creating a new entry and outputting the index data of the new entry when the conforming entry does not exist; and writing the index data and the serial code of the network node address into the address table memory.

* * * * *